US008352725B1

(12) United States Patent
O'Toole, Jr.

(10) Patent No.: US 8,352,725 B1
(45) Date of Patent: Jan. 8, 2013

(54) METHOD AND APPARATUS FOR MANAGING SECURE COMMUNICATIONS

(75) Inventor: James W. O'Toole, Jr., Somerville, MA (US)

(73) Assignee: CISCO TECHNOLOGY, Inc., San Jose, CA (US)

( * ) Notice: Subject to any disclaimer, the term of this patent is extended or adjusted under 35 U.S.C. 154(b) by 1248 days.

(21) Appl. No.: 10/419,484

(22) Filed: Apr. 21, 2003

(51) Int. Cl.
*H04L 29/06* (2006.01)

(52) U.S. Cl. ........................................ 713/151

(58) Field of Classification Search .............. 713/153, 713/154, 155, 160, 161, 151; 726/22
See application file for complete search history.

(56) References Cited

U.S. PATENT DOCUMENTS

| 5,996,076 | A | 11/1999 | Rowney et al. ............... 713/201 |
| 6,092,201 | A * | 7/2000 | Turnbull et al. ................ 726/4 |
| 6,185,546 | B1 * | 2/2001 | Davis ............................... 705/51 |
| 6,233,577 | B1 | 5/2001 | Ramasubramani et al. ...... 707/9 |
| 6,314,409 | B2 | 11/2001 | Schneck et al. ................. 705/54 |
| 6,477,150 | B1 | 11/2002 | Maggenti et al. ............. 370/312 |
| 6,516,316 | B1 | 2/2003 | Ramasubramani et al. ...... 707/9 |
| 6,516,416 | B2 | 2/2003 | Gregg et al. ................... 713/201 |
| 6,938,156 | B2 * | 8/2005 | Wheeler et al. ............... 713/170 |
| 7,013,389 | B1 * | 3/2006 | Srivastava et al. ............. 713/163 |
| 7,251,729 | B1 * | 7/2007 | Park .............................. 713/168 |
| 7,305,711 | B2 * | 12/2007 | Ellison et al. .................... 726/29 |
| 2001/0032335 | A1 * | 10/2001 | Jones ............................. 725/105 |
| 2002/0095507 | A1 * | 7/2002 | Jerdonek ....................... 709/229 |
| 2003/0126433 | A1 * | 7/2003 | Hui ................................ 713/158 |
| 2003/0130947 | A1 * | 7/2003 | Benantar ......................... 705/44 |
| 2004/0003247 | A1 * | 1/2004 | Fraser et al. .................. 713/169 |
| 2004/0064691 | A1 * | 4/2004 | Lu et al. ........................ 713/158 |
| 2004/0086127 | A1 * | 5/2004 | Candelore ...................... 380/281 |

* cited by examiner

*Primary Examiner* — Philip Chea
*Assistant Examiner* — Daniel Hoang
(74) *Attorney, Agent, or Firm* — Patterson & Sheridan, LLP

(57) ABSTRACT

A device for managing secure communications by examining message packets to detect and control the use of encryption keys noninvasively examines an incoming message packet according to typical cryptographic protocols and sequences. If an incoming packet exhibits the use of an encryption key, such as via IKEP, IPsec, or PPTP, the device processes the packet to attempt to find the corresponding encryption key. The device compares the key to a list of known suspect keys to determine a blocked status. If the key is not on the list, a sequence of authorization rules concerning prohibited key usage attempts to determine a result. The authorization rules examine available keying attributes from the message packet, possibly via a remote server, and compute an indication concerning key usage. If the authorization rules are still undeterministic of usage of the key, the device uses a default action. The default action indicates whether to allow or block usage of the key until a deterministic response indicates the key status.

27 Claims, 8 Drawing Sheets

| IP ADDRESS | CIPHER | KEY | LOCALID | STATUS |
|---|---|---|---|---|
| 126.2.3.4 | RSA | PUBxxyyzz | LCL01 | ALLOW |
| 100.5.6.7 | DES-3 | PRIVuuvvww | SPIDU2 | BLOCK |
| 126.12.13.14 | MD5 | AUTHaabbcc | LCL03 | ALLOW |

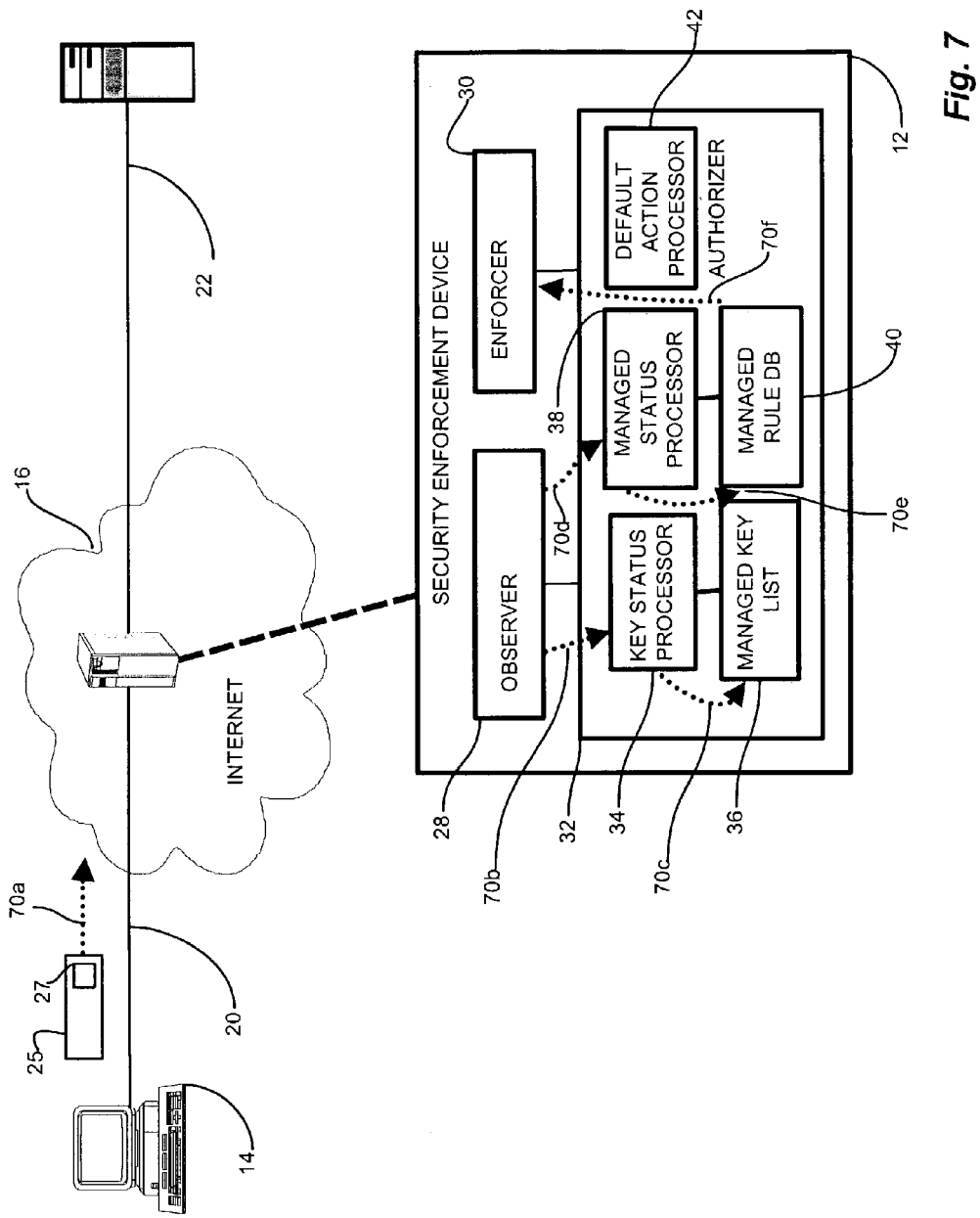

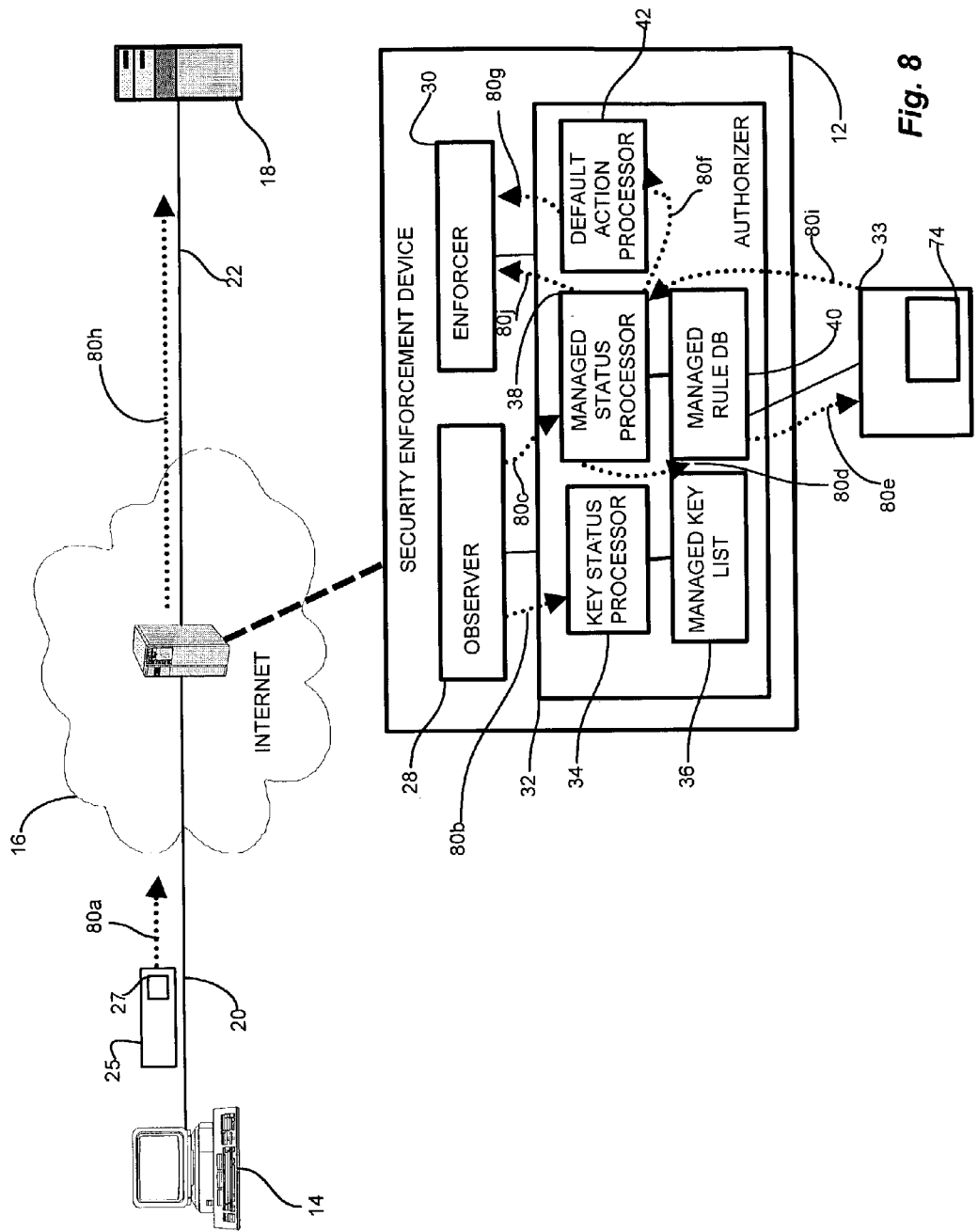

METHOD AND APPARATUS FOR MANAGING SECURE COMMUNICATIONS

BACKGROUND OF THE INVENTION

Conventional communications networks often employ data security techniques to ensure the integrity and authenticity of data transmitted over the network. Communications devices within such networks use cryptographic operations, such as encryption and authentication, to protect the transmitted data from security threats. Such security threats include loss of privacy, loss of data integrity (tampering), identity spoofing, and denial of service, to name several. The conventional data security techniques attempt to protect communications from such attacks.

Traditionally, certain authoritative entities have sought to maintain control over various types of electronic communication. For example, a corporation typically limits or restricts personal telephone and email use during working hours. Government entities have endorsed limited use of wiretaps and other communications surveillance for law enforcement and national security reasons. More recently, certain courts have imposed duties on employers to exercise reasonable care that communications equipment is not being used for illegal, illicit, or offensive communications, for example through the use of email and web browsers. Encryption technology, however, hinders the ability of third parties to control and monitor such communications. Accordingly, certain authorities have attempted to mandate, by fiat or legislation, controlling measures such as registration of security measures, requiring the use of certain technology, escrowing security instruments (e.g., secret keys) used for encryption, and registration of such secret keys.

Attempts to regulate the use of encryption technology have met with limited success. Federal legislation imposes export controls on software and hardware enabling keys exceeding a certain size. Other political and sociological factors weigh in on the lawful restriction and enforcement of encryption technology. Certain groups oppose the notion of limiting or regulating the use of communications technology based on privacy and other First Amendment grounds. Accordingly, the debate over third party (e.g., government, corporate, or other sovereign) oversight of data security measures has the practical effect of impeding the standardization and widespread adoption of available encryption technology for routine communications.

For example, the National Security Agency (NSA) at one time endorsed a device called a "clipper" chip as a means of embedding a "back door" onto computing devices that would facilitate the ability of law enforcement agencies to bypass encryption security measures. Difficulties with mandating the inclusion of such a chip in widely distributed hardware baselines resulted in the failure of this approach. Also, since computing hardware tends to be rapidly deployed, inability to retrofit widely disseminated hardware installations limits the effectiveness of incorporating such technology only in new devices.

Conventional Public Key Infrastructures (PKIs) incorporate Certificate Revocation Lists (CRLs) to propagate keys that have been revoked and therefore should not be trusted. However, a conventional implementation employing CRLs requires authentication through a known chain of certification authorities (CAs) that have authenticated the revoked key. Accordingly, CRLs impose substantial overhead and have not been widely employed for this reason.

Key Escrow attempts have also proven unwieldy due to implementing a mechanism to legislate and enforce such requirements. Key escrow requirements exist in various situations involving governmental and/or corporate communication policies, however, the policy makers have difficulty enforcing compliance with such a key escrow policy. Such policy makers are usually able to enforce key escrow most efficiently when they actually issue the keys to the individual end-users, but even in such cases they may not able to ensure that no unauthorized keys are also being used. This may be because of indifference and resistance by the user, who may be opposed to, or simply not want to be bothered with, voluntary proactive deposit of the key. Also, storage and cataloging of keys imposes substantial overhead and consumption of resources on the escrowing agent. Further, forcing involuntary deposit also meets substantial political, legal, and implementation hurdles. For the above reasons, efficient and practical enforcement of generalized security technology registration and enforcement has not been feasible.

SUMMARY

Unfortunately, empowered authorities, such as corporate IT departments, managers, and overseers of sensitive information systems may desire to monitor or control the use of cryptographic technology by employees or other users of their communication networks. Such end-users are often likely to have access to confidential information and/or to be operating desktop or laptop computers which the corporation desires to protect from harm by computer viruses, for example. However, efforts have shown that it is difficult to efficiently implement a mechanism for monitoring and controlling the use of cryptographic technology by a particular set of users. The very nature of such cryptographic technology for encryption and authentication tends to evade conventional enforcement techniques because encryption keys are fleeting entities which a user's computing device rapidly generates, uses, and obsoletes. Nonetheless, entities such as corporate officers and law enforcement agencies seek control of encryption technology because traditional methods of corporate oversight, monitoring and intelligence gathering tend to be thwarted by this modern technology.

For example, Federal officials such as DEA (Drug Enforcement Agency) officials employ wiretaps on telephone lines to target and gather incriminating evidence against distributors of illegal drugs. Similar Federal agencies target illegal activity concerning firearms, weapons, and offshore cash flow. The NSA and CIA address national security interests using various intelligence gathering means including interception of communications.

The conventional methods described above do not offer an efficient and practical solution to effective detection and control of cryptographic technology. Accordingly, the unlawful user of encryption technology is able to evade conventional enforcement techniques because empowered sovereigns such as corporate and government entities are unable to prevent the undesirable or illegal dissemination and use of encryption keys for such communication. Accordingly, it would be beneficial for a communications network operator to deploy a mechanism for monitoring and enforcing the use of such keys so that unauthorized or undesirable use of a key is detected and potentially disallowed.

Embodiments of the invention significantly overcome such deficiencies with the above-described conventional approaches and provide mechanisms and techniques for managing secure communications by examining user transmissions to detect and control the use of encryption keys. Generally, example embodiments of the invention cause a data communications device, such as a switch or router, to noninvasively examine an incoming message packet. If the incoming packet exhibits the use of an encryption key, such as an IKEP (Internet Key Exchange Protocol) packet or a PPTP (Point-to-Point Tunneling Protocol) packet, the device equipped with the invention processes the packet to find a corresponding encryption key. In one embodiment, the device first compares the encryption key to a list of known suspect (e.g., "bad") keys to see if key usage is to be blocked. If the key is not found on the list, the device can invoke a sequence of authorization rules concerning key usage. The authorization rules specify how to determine keys that are allowed and keys that are to be blocked, and the device can use the rules to examine available keying attributes such as the certificate, the key itself, the CA (Certificate Authority), the source and destination IP addresses, the encryption cipher being used, and the key size, to name several. Depending on the keying attributes available in the examined packet (i.e., the key itself may be unavailable), the device uses the authorization rules to compute an indication concerning key usage. If the authorization rules cause the device to still be undeterministic of whether to block or allow usage of the key, the device uses a default action. In one configuration, a default action of "allow" indicates that the device is operating in a logging mode and the device will allow the secure communications and merely log the usage of the key. A default action of "block" implies that the device will block usage of the key until receiving an affirmative indication to allow key usage.

In a particular arrangement, the data communications device manages secure communications by identifying a first endpoint device and a second endpoint device, and intercepting a request to initiate secure communications between the devices. The request includes a security usage indicator, such as a key in an IKE (Internet Key Exchange) packet, or any other indicator indicative of an intended secure session to be employed for the secure communications between the first and second endpoints. Upon detecting the security usage indicator, the device builds a secure authorization query corresponding to the security usage indicator. The device applies the query to secure authorization logic to analyze the security usage indicator and compute a secure usage result indicative of a "block" or "allow" result of whether or not to allow the intended secure session using the key corresponding to the security usage indicator.

The device then enforces the secure usage result by selectively allowing or prohibiting establishment of the intended secure session for secure communications between the first and second endpoint devices based on the secure usage result. In this manner, the data communications device enforces restrictions and controls on key usage by realtime queries of lists and rules concerning disallowed keys, CAs, users and other keying attributes and blocking or monitoring secure communications using disallowed keys by discarding and/or logging the requests.

The data communications device for security enforcement as defined herein, therefore, is operable to receive a secure authorization query and respond with a secure usage result specific to the key or keys in the query according to the secure authorization logic. The secure usage result need not restrict usage even in the case of a match in the secure authorization logic, but rather is operable to merely indicate passive monitoring of the key, as indicated above. While a user of the data communications device may employ the device for surveillance and decryption of suspected covert communications, a broader use entails a policy goal of tracking and monitoring encryption modes and parameters are employable by which users, for example key size, key type, etc.

Conventional exchanges for secure communications typically employ known protocols for exchanging keying material. In one conventional architecture, described in Cheng, "An Architecture for the Internet Key Exchange Protocol," Pau-Chen Cheung, IBM Systems Journal, Vol. 40, No. 3, ©2001 IBM Corporation, incorporated herein by reference in its entirety, the author describes a set of typical sequences of messages for using keys to establish secure communications using the IKE protocol. In one particular configuration of the present invention, anticipation of the key exchange messages as defined herein allows the device to intercept the keys or indications thereof for scrutiny using a secure authorization query.

Briefly summarizing, by way of example only, the description of key exchange messages as suggested by the six message exchange of Cheung is illustrative in disclosing the interception and usage of such key messages thereof by the present invention. Briefly, the conventional aspects of IKE, which are known to those skilled in the art, and operable by the device as discussed below, include the following: (A) SA-proposal/choice (messages 1 and 2), fields to use, and whether they are encrypted; (B) key-material-exchange (messages 3 and 4), usefulness of fields and other dependencies; (C) completion (messages 5 and 6) and when/if they can be decrypted at all; and (D) the relationship between these IKE messages and other IPSec traffic, tied by SPI (Service Profile Identifier) values.

As suggested in Cheung, concerning the relationship between these IKE messages and other IPSec traffic, the IKE 6-message exchanges illustrated provides that, generally speaking, as long as the enforcer component of the device blocks at least one of the messages consistently, the two parties I (Initiator) and R (Responder) will not succeed in establishing working IPSec communication using the SPI values in these messages. However, it is more certain that the enforcer will succeed if it blocks both messages 5 and 6, or even better, to block messages earlier in the exchange. Also, however, it will usually be the case that even if the enforcer does not block any of these messages, but it does store the IP addresses (contained in all messages) and the SPI values (shown within the SA-proposal and SA-choice portions of messages 1 and 2), then any authorization decision made (immediately or later) based on any attribute identified based on the IKE messages can be applied to IPSec traffic that is intercepted traveling between I and R using those same IP addresses and SPI values. With respect to SA-proposal/choice messages (1 and 2), respective fields to use and encryption thereof, the messages contain the SPI values. Also in the SA-proposal and SA-choice fields are one or more choices of encryption algorithms that I and R may use for their IPSec traffic. This corresponds, for example, to the CIPHER selection discussed further below with respect to the present invention.

Further, it is possible for these messages to be encrypted in their entirety. For example, if I and R use IKE to setup IPSec, and then using IPSec to encrypt their traffic, they again use IKE, then the enforcer will not be able to analyze the second round of IKE unless it has obtained and stored the decryption keys for the initial IPSec association. However, if the messages corresponding to I and R use the "QUICK mode" shown in Cheng, a very similar result is achieved, because the messages for "QUICK mode" have all fields following the IKE header encrypted using keys from a prior (unexpired) IPSec association. In this situation as well, the enforcer is not be able to analyze the contents of the Quick-mode IKE messages unless it had obtained and retained the decryption keys negotiated for the other IPSec association. However, in this case the enforcer readily identifies that these are IKE QUICK-mode messages based on the message header, and if it did not have the keys for decrypting them, it is operable to block the messages, thereby disabling the use of QUICK mode. This would force I and R to redo IKE, giving the enforcer the same opportunity it had previously to make decisions about I and R's authorization to use IPSec. However, it is acceptable in many situations to permit (or deny) this subsequent IKE exchange and associated IPSec usage based on whatever decision had previously been reached regarding the earlier IPSec association. One possible difficulty is that because Quick-mode has encrypted the SA-proposal and SA-choice fields, which contain the SPI values, the enforcer would not be able to rely on SPI values to make decisions about IPSec traffic, and would have to make decisions sometimes based only on the IP addresses. Such an outcome may, however, be acceptable in many situations.

Regarding key-material-exchange messages (3 and 4), usefulness of fields and other dependencies, and the completion messages (5 and 6) and when/if they can be decrypted at all, the following examples of what fields are in the messages and how the device of the invention processes them may be illustrative. One aspect is identifying what parts of the messages would be the "key" to be managed or controlled according to the present invention. The conventional IKE exchange involves a plurality of keys and various key material, many portions of which are protected to avoid disclosure. Summarizing briefly, there are 4 modes of key negotiation: pre-shared key mode, public key-signature mode, public-key-encryption mode, and revised-public-key-encryption mode. In all of these modes, the two parties I and R use Diffie-Hellman Key Agreement, and the enforcement appliance will only be able to obtain the encryption keys if it compromises the DH key agreement in some way. It should be noted that it is not necessary to the operation of the invention that the keys be obtained; this relates to the point about "QUICK mode" above. Obtaining the keys enables more functionality, but also compromises the security of I and R to a greater degree. Alternate configurations of the invention employ this aspect to an optimal extent.

The pre-shared key mode is likely to be used only in closed (private vpn) systems. The invention could be applied to block such private unauthorized vpns; to selectively block them would require both that the enforcer had access to the pre-shared key material and that it compromise the DH key agreement. The DH agreement can be compromised in two ways. One is to require at least one of the endpoints to artificially restrict its DH secret choice (say I selecting Xi to compute gXi) to a single known value or a restricted set of values. Another method is to actively modify all the messages, altering the message content and therefore also altering what keys are negotiated. This second method, however, implies that all subsequent IPSec traffic between I and R also have to be intercepted, decrypted, and then re-encrypting using other keys. This re-encrypting may, in particular configurations, present issues concerning scalability to large intercepted traffic volumes.

The public-key-signature mode differs from the pre-shared key mode in how the encryption key is computed (no use of pre-shared key) and in what confirmation codes are used in messages 5 and 6. Note that in both of these two modes so far, the enforcer component of the device must have compromised/restricted the DH secret selection by at least one party (I or R) in order to obtain detailed information about the identity of the participants and to be able to decrypt subsequent messages.

The public-key-encryption mode exposes the value {ID-i}PK-R in message 3. Therefore, although (as in other modes) complete access to I's private key and DH-secret information would be required to fully decode the contents of the IKE messages, such is not necessary merely to enforce a restriction about what I's can conduct IPSec traffic with what R's, or using what kind of encryption. The kind of encryption is exposed in SA-proposal and SA-choice. The identity of I and R is not exposed explicitly, but restricting usage to a pre-approved set of (I,R) pairs is feasible because the value of {ID-i}PK-R (as well as the optional value in message 3 "hash1") can be precomputed. For example if a corporation wanted to restrict usage to 10,000 authorized client humans or their computers, for communication with 1,000 authorized secure servers, then this would represent 1,000×10,000, or 10,000,000 precomputed values of {ID-i}PK-R (that represents the identity of I "ID-i" encrypted using the public-key of R). It may be practical for the security enforcement device to store these 10,000,000 values, but even if not, it is surely practical for it to extract the candidate value from message 3 and transmit the value to an authorization server for approval or disapproval of IPSec connectivity.

The revised public-key-encryption mode changes the content of message 3 to avoid exposing the value {ID-i}PK-R directly. However, as long as the security enforcement device can guess or otherwise identify I by other means, and has knowledge of I's private key (the private key counterpart to PK-I), then message 4 can be decrypted, revealing ID-R. In this manner, with both the identity of I and R confirmed, an authorization decision can be made based on that information as well as the encryption algorithm and key size choices indicated in SA-proposal or SA-choice in messages 1 and 2.

The data communications device, therefore, can detect the use of known security protocols and key exchange sequences, such as the IKE protocol described above. In another configuration, the security enforcement device observes the attempted use of the Point-to-Point Tunneling Protocol (PPTP), which is typically employed for Virtual Private Networks (VPNs), and uses information read during establishment of this protocol session as the security usage indicator. It should be noted that the device does not require the use of PPTP for VPNs, or the use of IKE for an IPsec exchange. Rather, the security enforcement device monitors network traffic for efficient identification of, and conditional response to, known security protocols, as opposed to exhaustive coverage and prevention of all possible or anticipated methods of initiating secure communications. The device, therefore, attempts to detect known methods of establishing secure communications and to then block usage deemed unacceptable without interfering with performance or preventing legitimate communications.

Further, the security enforcement device can also observe post-key generation usage, such as via Service Profile Identifier (SPI) use, to identify typical practices of session key reuse. Post-key generation usage occurs when an endpoint stores a key from a previous session so that the endpoint may reuse the key within a certain time interval. In this context, the endpoint generally does not require an initial message containing a plaintext key, but rather embeds an identifier such as the SPI or other index pointing to the key, which one of the endpoints actually stores from the earlier session. Such post-key-bootstrapping identification allows the device of this invention to perform efficient detection and tracking of suspect key usage without burdening the device throughput with exhaustive processing and analysis of all throughput traffic.

The security enforcement device further applies the secure authorization logic in an unintrusive manner such that the communications endpoints are unaware of the secure authorization query. In this manner, the user does not detect monitoring by the device, particularly if applying the secure authorization result does not otherwise hinder communication.

Further, querying the secure authorization logic additionally comprises determining keying material attributes from the security usage indicator, in which the keying material attributes correspond to an intended key that two endpoints use for the secure communications. The keying material attributes may be a SPI or other session identifier targeted at key reuse, or other attributes that the device can observe and that indicate a pattern of key usage. In this manner, the device does not actually require detection of the plaintext key in order to monitor and enforce key usage. Rather, the device determines the intended key or other pattern corresponding to the keying material attributes.

The security enforcement device in one arrangement enforces the secure usage result by disallowing communications, allowing secure communications pending further key usage authorization results, logging communications, and allowing secure communications. Accordingly, the device may operate in an "observation" or logging mode in which the device detects, but does not prevent, suspect key usage. Further, if the secure usage result is not immediately indicative of whether to allow secure communications, the device may wait pending the query results and allow secure communications until a subsequent secure communications result is received. Therefore, the device will not inconvenience a user by preventing secure communications if it is unable to compute a deterministic result immediately. However, once the device computes a deterministic result to block communications, the result applies to subsequent secure communications attempts, or alternatively the device may break or sever the previously allowed secure session that is thereafter determined to be using an unauthorized key.

In an alternate configuration, the device further subdivides the secure authorization query into a key status query, a key usage authorization query, and a default action query. Each of the status query, the key usage authorization query, and the default action query are operable to generate the secure usage result. Depending on the configuration and location of remote systems, the device applies the result of one or more of these queries.

In the case of a key status query, querying the secure authorization logic includes generating the key status query including the intended key, receiving, at a key status processor the key status query, and comparing the intended key to a managed key list having managed keys. The managed key list is a local list that may be quickly indexed to achieve a relatively fast secure usage result. The term "managed" key as employed in the present invention does not necessarily imply restrictive or denial of usage. The device is operable to benignly record and track usage of the managed keys, without necessarily interfering with use or operation thereof. Alternatively, the key usage authorization is responsive to the secure authorization logic and may attempt to block or curtail usage via interrogation and manipulation of the key exchange protocols as defined herein.

A key usage authorization query typically includes a rule base having rules for applying the keying material attributes, and computes, in a managed status processor, a rule deterministic of the status of the intended key. The device applies the computed rule to the keying material attributes to generate key usage authorization results, and computes the secure usage results based on the computed rule. The rule base allows analysis of the keying attributes and may be performed even if the intended key cannot be determined by operation on the keying attribute results associated with the intended key. Further, the intercepted attributes may correspond to a non-key based cipher, in which case keying attributes that are merely indicative of a particular trend may apply.

The default action query computes a default action indicative of an acceptable usage of the intended key if no deterministic result is found immediately. The default action may allow the secure communications, may hold the communications pending a response from a remote key server, or may disallow the communication.

The full secure authorization query involves each of the key status query, key usage authorization query, and the default action query, which the device applies in order until it computes a secure usage result. Other arrangements apply a subset of the secure authorization query, or modify the order, depending on the usage patterns of the target system.

In a particular arrangement, the secure authorization query follows a thread, or sequence of steps, that includes first indexing the security usage indicator in a local datastore to retrieve a Boolean indicator corresponding to permissible usage of the key corresponding to the security usage indicator for secure communications. If the device does not find the key in the local datastore, the device determines the key usage authorization result, and, if it is not immediately indicative of permissible use applies the default action until the key usage authorization result is available. The key authorization server for applying the key usage authorization query may be remote, and transmitting the key usage authorization query to invoke a rule base for determining the secure usage result may involve receiving the key usage authorization from the key authorization server that serves a plurality of secure enforcement devices.

The features of the invention, as described above, may be employed in systems, data communications devices and methods, as well as other computer-related components such as those of Cisco Systems, Inc. of San Jose, Calif.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

FIG. 7 is an example of detection and control of secure communications by the data communications device of FIG. 3 via a secure socket layer (SSL) protocol.

FIG. 8 is an example of detection and control of secure communications by the data communications device of FIG. 3 via an IPsec protocol.

DETAILED DESCRIPTION

Figure 1:
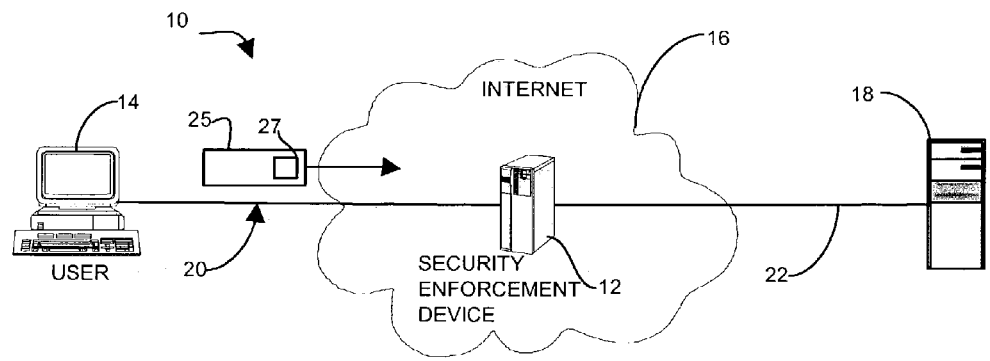
FIG. 1 is a context diagram of a communications system which is suitable for use with the present invention employing a data communications device as defined herein.

Embodiments of the invention provide for managing and controlling secure communications by employing a data communications device that noninvasively examines an incoming message packet to determine a security usage indicator indicative of the use of an encryption key. As an example, the device can process the packet to find a corresponding encryption key, and compares the encryption key to a list of known keys to see if key usage is to be blocked. If the key is not found on the list, the device invokes a sequence of authorization rules concerning key usage. The authorization rules specify how to determine keys that are allowed and keys that are blocked, and examines available keying attributes such as, for example, the certificate, the key itself, the CA, the source and destination IP addresses, the encryption cipher being used, and the key size, to name several.

Depending on the keying attributes available (i.e., the key itself may be unavailable), the device receives an indication, via the authorization rules, concerning key usage. If the authorization rules are still undeterministic of whether to block or allow usage of the key, the device can use a default action. A default action of "allow" indicates that the device is operating in a logging mode and will allow the secure communications and merely log the usage of the key. A default action of "block" implies that the device will block usage of the key until receiving an affirmative indication to allow key usage.

For example, suppose a user attempts to set up a secure session employing a restricted key. The user sends a packet according to the Internet Key Exchange Protocol (IKEP) which includes a plaintext public key to be used for the secure communication. The device identifies a security usage indicator in the IKEP packet, and accordingly, extracts the user's public key from the packet, according to the well-known format specified by the protocol, and compares it to a managed key list having disallowed keys. If the device finds the key on the managed key list, the device blocks the secure session by not forwarding the packet to the remote endpoint. Alternatively, the device does not find a deterministic key status on the managed key list, and invokes the secure authorization logic using a secure authorization query with other key attributes obtained from the IKEP packet to determine a secure usage result.

In a particular configuration, described further below, the device is conversant in the IPsec (Internet Protocol security) and related protocols. IPsec involves the use of AH (IP Authentication Header) and ESP (Encapsulated Security Payload). The IKE protocol operates in a variety of modes, as is known to those skilled in the art, and is discussed in further detail in IETF RFC 2409—The Internet Key Exchange (IKE), incorporated herein by reference (Internet Engineering Task Force, Request for Comments 2409). Briefly, the configurations disclosed herein employ the messages exchanged according to IKE as exemplary configurations of the invention. Other protocols and message exchange sequences may be employed in alternate configurations without deviating from the scope of the invention as claimed below.

FIG. 1 is a context diagram of a communications system which is suitable for use with the present invention. Referring to FIG. 1, the communications system 10 includes a public access network 16 such as the Internet, a user 14, or first endpoint, and a second, remote endpoint 18. The user 14 is connected to the network 16 via a user connection 20, and the remote endpoint 18 connected to an endpoint connection 22. The data communications device 12 is a security enforcement device configured according to embodiments of the invention and is connected to the network 16 between the first and second endpoints 14, 18 and receives and forwards message traffic between the user 14 and the remote endpoint 18.

In operation, the user 14 sends a request to initiate secure communications with the remote endpoint 18 by transmitting one or more packets 25 over the user connection 20. The data communications device 12 receives the packet 25 via the network 16 of this invention. The device 12 nonintrusively reads the packet 25, attempts to identify any security usage indicators 27 present in the packet 25, and forwards the packet 25 onto the destination remote endpoint 18 via the endpoint connection 22.

Figure 2:
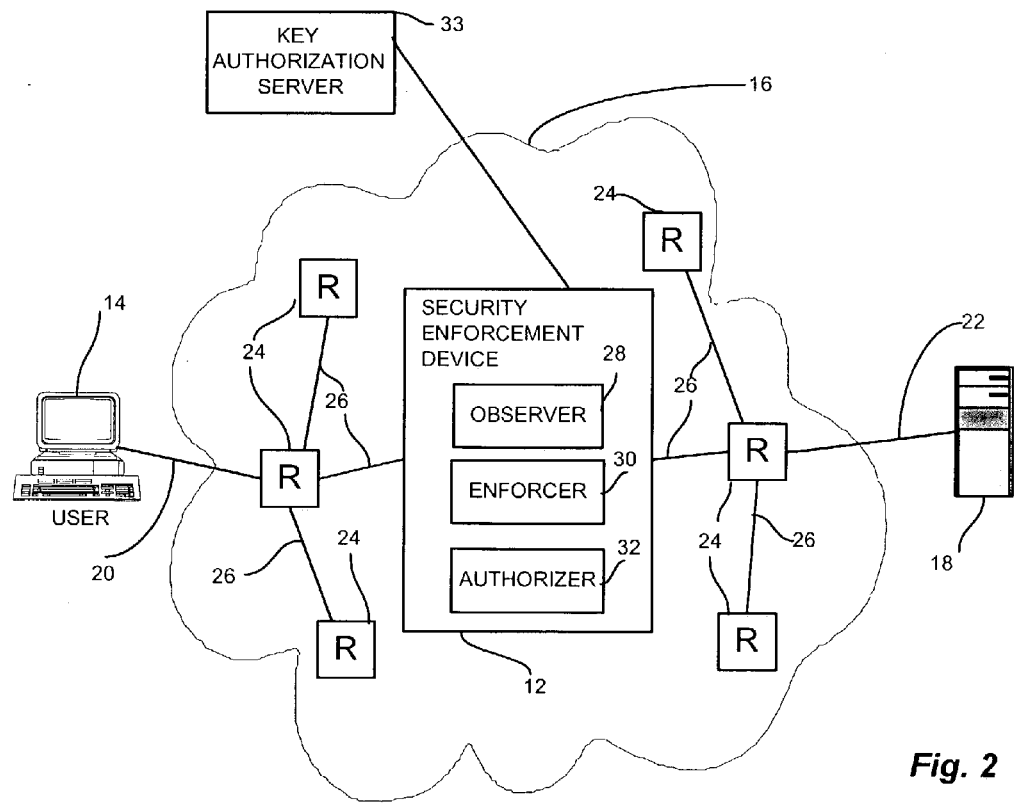
FIG. 2 is a block diagram of the data communications device employed in the communications system of FIG. 1.

FIG. 2 is a block diagram of the data communications device 12 employed in the communications system 10 of FIG. 1. Referring to FIG. 2, the device 12 is illustrated in greater detail. The data communications device 12 includes an observer 28, an enforcer 30, and an authorizer 32. The network 16 includes a plurality of routers 24, which may include switches, hubs, and other connectivity devices. The device 12 operates as a security enforcement device 12 that functions similar to a router or switch 24 along the series of "hops" between the routers 24, as shown by links 26. A key authorization server 33 is also in connected to the network 16.

The security enforcement device 12 performs the throughput switching and routing functions of the routers 24 as packets are transmitted across the network links 26. The security enforcement device 12 also operates to enforce secure communications as defined further below. The device 12 invokes the observer 28, the authorizer 32, and the enforcer 30 to generate a secure authorization query and compute a secure usage result. The key authorization server 33 is also in communication with the security enforcement device 12 for computing a secure usage result, and in alternate configurations may be connected to multiple security enforcement devices 12.

Figures 3, 5:
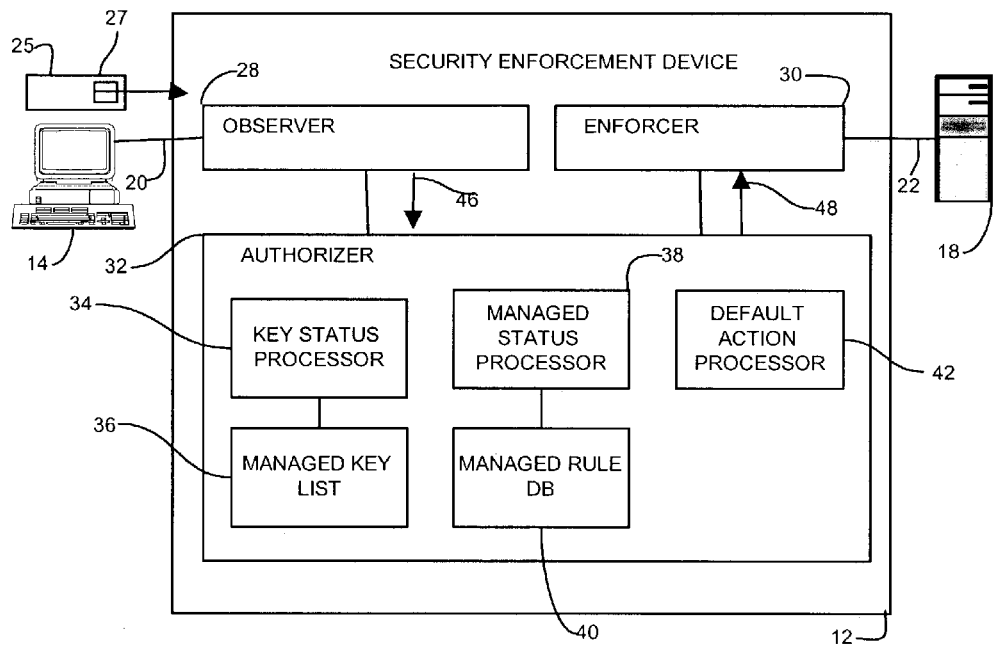
FIG. 3 is a block diagram showing the data communications device of FIG. 2 in more detail.
FIG. 5 is a diagram of a managed key list employed by the data communications device of FIG. 3.

FIG. 3 is a block diagram showing the security enforcement device 12 of FIG. 2 in more detail. The high level operation of these components will be explained here briefly followed by a detailed flowchart further below with respect to FIGS. 4a-4c. Referring to FIG. 3, the observer 28 in the device 12 is connected to the user link 20 to receive and detect packets 25 that indicate the attempt to establish secure communications. The authorizer 32 computes authorization of a particular detected key, and includes a key status processor 34, a managed key list 36, a managed status processor 38, a managed rule database (DB) 40, and a default action processor 42. The enforcer 30 applies the result of the secure authorization to block or allow secure communications.

The observer 28 in the device 12 detects a security usage indicator 27 in packets 25 received over the user link 20 that indicate the attempt to establish secure communications. Security usage indicators 25 include, by way of example, a certificate, an IKEP bootstrap packet, a public key (which is contained in the IKEP bootstrap packet), a key hash or checksum, or an SSL port specification. Other indicators are employed and detectable by parsing the packet. Further, the security usage indicator 27 may be an actual keying attribute itself, such as the key or certificate, or may be a related data item indicative of secure communications, such as an IKEP protocol tag or a session key identifier such as a SPI, described further below.

Once the observer 28 detects a request to establish secure communications via the 27, it undestructively parses the security usage indicator 27 and relevant keying attributes and attempts to determine the intended key. The authorizer 32 receives the key and other keying attributes from the observer 28, and attempts to verify authorization. If the observer 28 does not detect security relevant indicators in the packet 25, it will merely forward the packet 25 onto the destination via the endpoint connection 22 as indicated by conventional routing and switching techniques (not shown).

The observer 28 forwards the packet 25 to the authorizer 30 to obtain authorization. Briefly, the authorizer 32 determines the intended key and determines whether or not to allow usage of the intended key. The authorizer generates a secure authorization query based on the security usage indicator, and analyzes the secure authorization query using secure authorization logic to compute a secure usage result indicative of whether to block or allow the user 14 to use the intended key for secure communications with the remote endpoint 18.

In a particular configuration, as shown in FIG. 3, the secure authorization logic within the authorizer 32 performs a plurality of checks and computations based on the secure authorization query. A key status processor 34 processes the secure authorization query to generate a key status query. As indicated above, the packet 25 may include a plaintext form of the intended key. The key status processor 34 searches a managed key list 36 for a matching key. If the intended key is found in the managed key list 36, then the key status processor 34 knows that the key is suspect and turns a secure usage result of "block" or prohibit usage of the key. An alternate arrangement includes an explicit status entry to allow usage of the key described further below, however otherwise the key status query indicates an undetermined result for the key status query.

The managed status processor 38 next receives the secure authorization query if the intended key was not found on the managed key list 36. The managed status processor 38 invokes the managed rule database 40 with key attributes found in the secure authorization query to determine authorization of the intended key. For example, the key may be known, but may not have been on the managed key list 36. Alternatively, the key may not be in the key status query, but the senders IP address is available and the sender is a known malicious source, or the destination IP address is determined to be overseas, and the key size is too large for such communications. Other applications of the rules used to authorize the intended key and determine a secure authorization result, such as a security usage indicator pointing to an earlier established key, are discussed further below with respect to FIG. 6.

In an alternate configuration, the managed status processor 38 is coupled with a remote key authorization server 33 (FIG. 1). The key authorization server 33 maintains the rule based system for processing the secure authorization query in addition to, or as an offload from, the local managed status processor 38 in the security enforcement device 12. Further, the key authorization server 33 is adapted to be coupled to a plurality of security enforcement devices 12 for aggregating managed key information and rules.

If the managed status processor 38 is not able to compute a deterministic secure usage result in a timely manner, the default action processor 42 receives the secure authorization query to determine a default action. The default action processor 42 will return a secure usage result of "block" or "allow" according to a global default setting, or it may hold the secure usage result for a predetermined period pending resolution by the managed status processor 38. If the managed status processor 38 is unable to immediately compute the secure usage result, possibly due to lag time required to access a remote key authorization server 33, the default action processor 42 can hold the secure usage result until the managed status processor receives a deterministic response to the secure authorization query.

A more restrictive environment indicates the need for a default action processor 42 to block secure communications until an allowed secure usage result is determined. This approach places security before user convenience. Alternatively, the default action processor will allow secure communications until receiving a secure usage result of "block," therefore only interfering with user communication when mandated for specific keys and rules. In the case of an allowed default action, a subsequent secure usage result indicating blocking would apply to subsequent packets. However, mechanisms that attempt session key reuse or otherwise bypass or abridge protocol exchanges of expected security usage indicators require additional processing to detect as will be discussed further below.

For example, suppose a user has previously established a secure session using a valid allowed key. During this previous session, the remote endpoint 18 stores the key or a corresponding session key for later reuse. Prior to a subsequent session, the key authorization server 33 learns of a key compromise, or invalidation. Thereafter, the user 14 attempts a subsequent secure session, but exchanges only an index to the previous session key, and does not send a certificate or plaintext key. An example of such an index may be, for example, a session or connection based reference such as an SPI. The managed status processor 38 sends the secure authorization query to the key authorization server 33, and the default action server 42 allows the secure communications between the user 14 and the remote endpoint 18. The security enforcement device 12, therefore, allows communication until the key authorization server 33 associates the managed key with the index or other key attribute that corresponds to the allowed secure session. This scenario is discussed further below with respect to FIGS. 7 and 8.

Figure 4A:
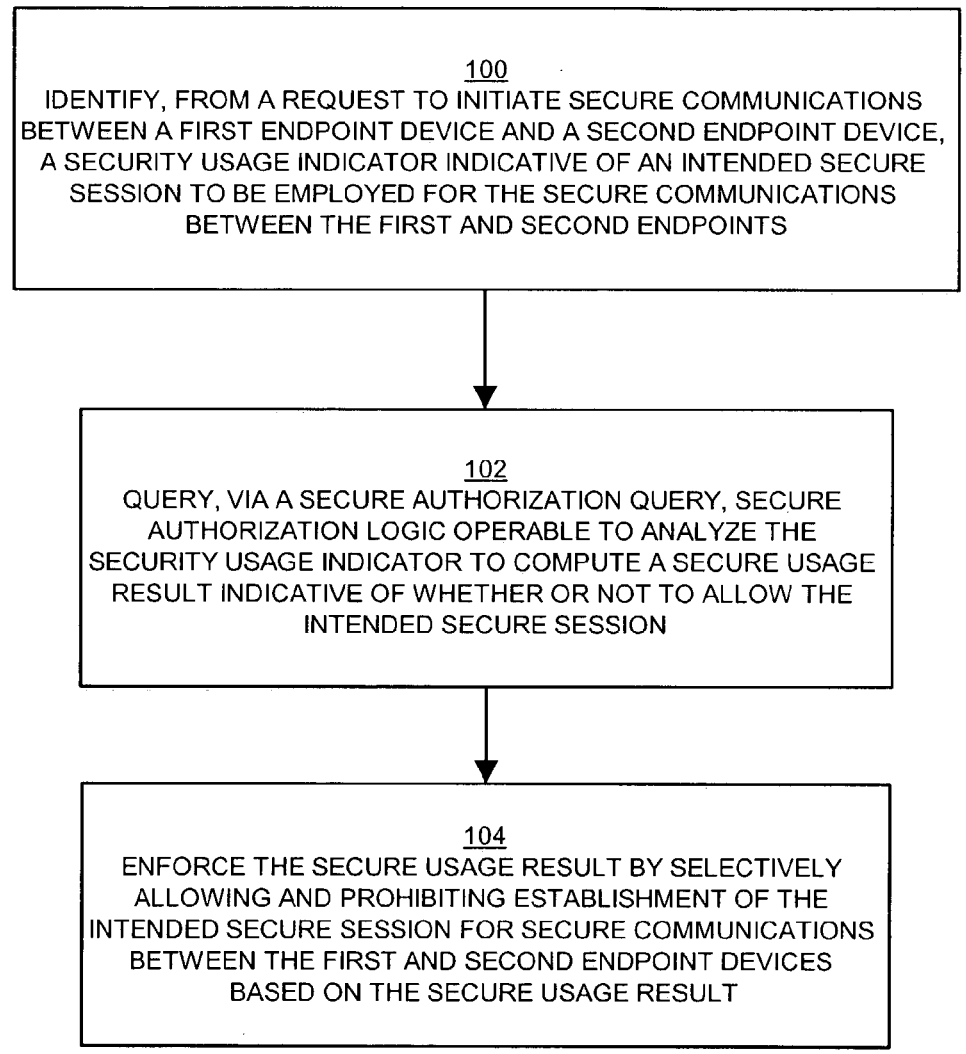
FIG. 4a is a flowchart of identifying and controlling secure communications employing the data communications device of FIG. 3.

FIG. 4a is a top level flowchart of identifying and controlling secure communications employing the security enforcement device 12 of FIG. 3. Referring to FIGS. 3 and 4a, in step 100, the security enforcement device 12 identifies, from a request to initiate secure communications between a first endpoint device 14 and a second endpoint device 18, a security usage indicator 27 indicative of an intended secure session to be employed for the secure communications between the first 14 and second 18 endpoints. The device 12 examines, or "sniffs," transmitted packets looking for a security usage indicator 27. In step 102, the device 12 queries, via a secure authorization query 46, secure authorization logic 32 operable to analyze the security usage indicator 27 to compute a secure usage result 48 indicative of whether or not to allow the intended secure session. The secure authorization logic 32 occurs, in a particular configuration, at a plurality of successive levels, described further below, and computes the secure usage result 48. At step 104, the device 12 enforces the secure usage result by selectively allowing and prohibiting establishment of the intended secure session for secure communications between the first 14 and second 18 endpoint devices based on the secure usage result 48.

Figure 4B:
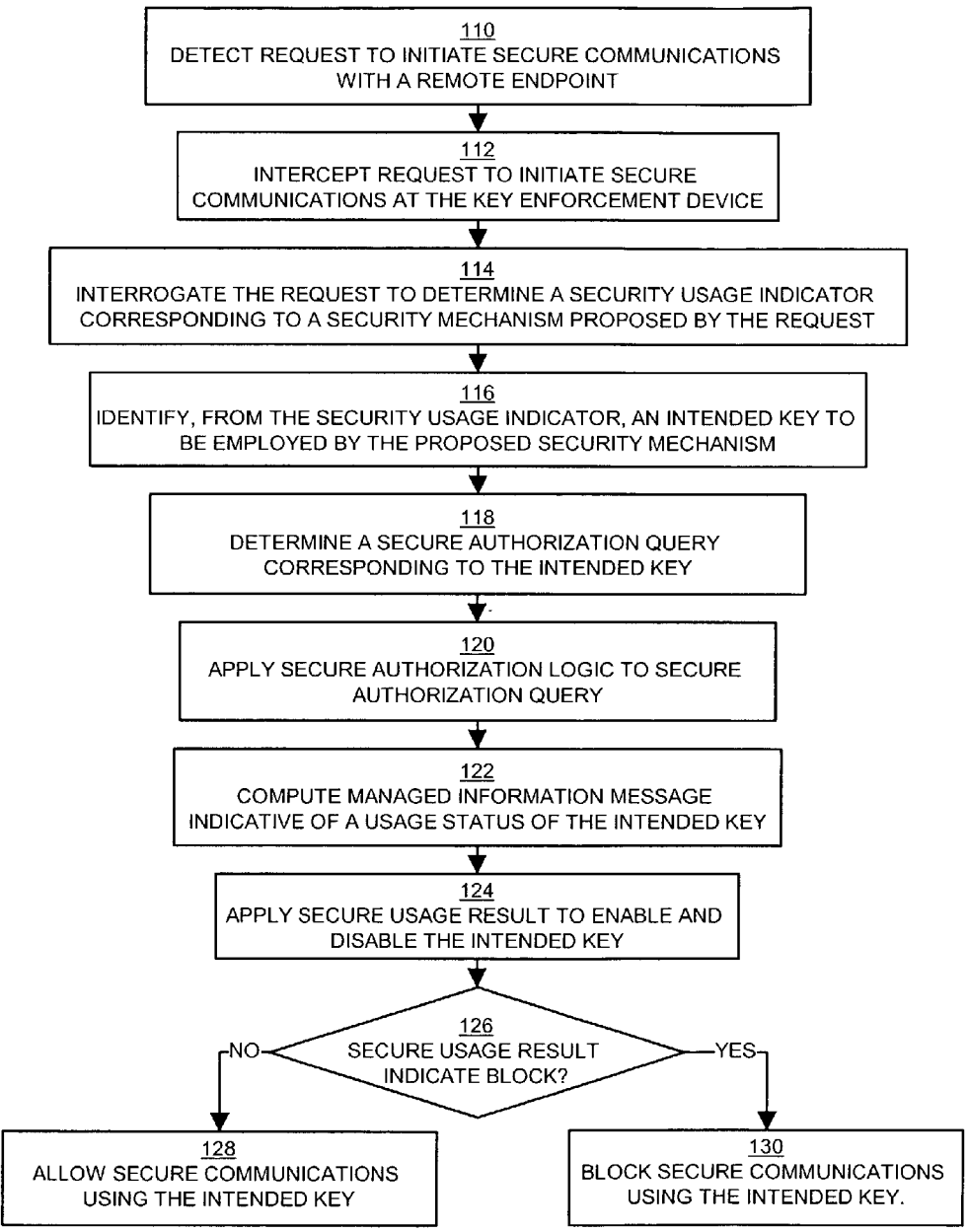
FIG. 4b is a flowchart of a procedure employed by the data communications device for detecting, authorizing, and enforcing control of secure communications by the data communications device of FIG. 3.

FIG. 4b is a flowchart of a procedure employed by the data communications device 12 of FIG. 3 for detecting, authorizing, and enforcing control of secure communications according to one embodiment of the invention. Referring to FIG. 4b, the key enforcement device 12 detects a request 25 to initiate secure communications with a remote endpoint 18, as depicted at step 110. In step 112, the device 12 intercepts the request 25 to initiate secure communications. To do so, the device 12 noninvasively interrogates the request 25 to determine or detect any type of security usage indicator 27 corresponding to a security mechanism proposed by the request 25, as shown at step 114. The security usage indicator 27 is operable to initiate the secure communications via a particular protocol, and may operate directly if the security usage indicator 27 points to a key in the request packet 25 itself, or indirectly as an identifier to a preexisting key or other keying attribute (e.g. a key already in possession of both endpoints 14, 18). The device 12 identifies, from the security usage indicator 27, an intended key to be employed by the proposed security mechanism, as disclosed at step 116.

Using the information from the identified packet 25, the device 12 determines a secure authorization query 46 corresponding to the intended key, as depicted at step 118. The query 46 identifies the key or other keying attributes that can be used to determine an allowed or prohibited use of a key or other security mechanism. The device 12 applies secure authorization logic 32 to the secure authorization query 46, as shown at step 120, and computes from the secure authorization query 46 via the secure authorization logic 32, a managed information message indicative of a usage status of the intended key, as disclosed at step 122. The device 12 applies, from the managed information message via the enforcer 30, a secure usage result 48 operable to enable and disable the intended key, as depicted at step 124. A check is performed, as shown at step 126, to determine if the secure usage result 48 disallows use of the key. The enforcer 30 allows, if the secure usage result 48 does not indicate prohibited usage, secure communications using the intended key, as depicted at step 128, and blocks secure communications using the intended key if the secure usage result 48 indicates prohibited use, as disclosed at step 130.

Figure 4C:
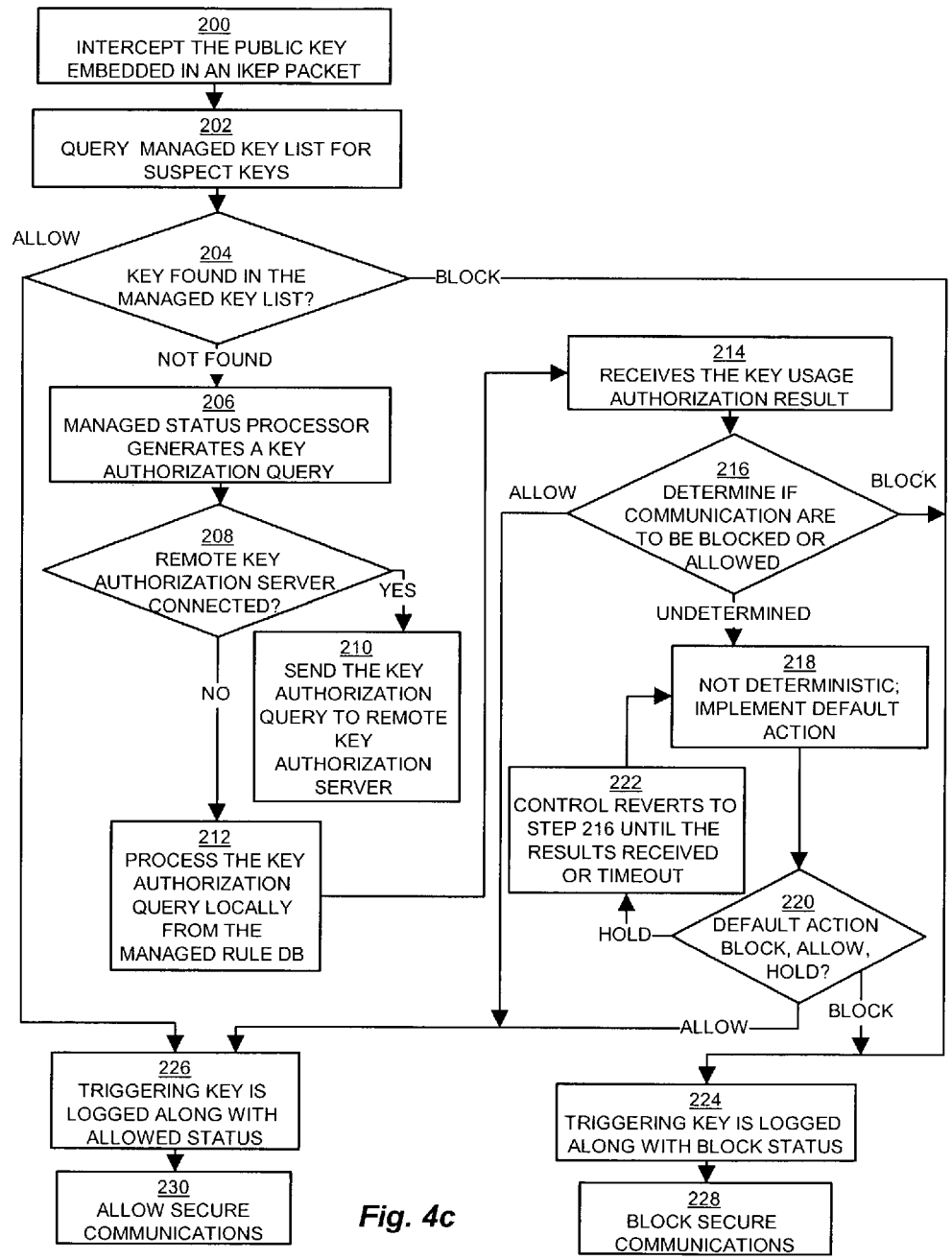
FIG. 4c is a flowchart of a procedure employed by the data communications device of FIG. 3 for authorizing secure communications in greater detail.

FIG. 4c is a flowchart of a procedure employed by the data communications device 12 of FIG. 3 for authorizing secure communications in greater detail. Referring to FIGS. 1, 3 and 4c, the processing and computation of the secure usage result 48 by the observer 28, the authorizer 32, and the enforcer 30 is shown in an exemplary arrangement. The observer 28 intercepts the public key 27 embedded in an IKEP packet 25, as depicted at step 200.

As described above, with respect to Cheng (2001), the observer 28 attempts to intercept the public key 27 by a variety of algorithms and available protocol exchanges. As Cheng indicates, certain abbreviated exchanges for improving key-exchange efficiency present various processing hurdles towards intercepting and determining the public key 27. In a particular configuration, an IPSec exchange presents complexities because IPSec attempts to minimize cleartext exposure of key material. One exemplary case employs IKE with aggressive and quick modes. Accordingly, the enforcer 30 performs several conditional steps in directly or indirectly determining the public key.

The IKE description is presented as exemplary; other security usage indicators 27 may be employed, as described above. The authorizer 32 queries the managed key list 36, which acts as a fast access cache for suspect keys, as shown in step 202. The authorizer 32 performs a check to determine if the key was found in the managed key list 36, as shown at step 204. If the authorizer 32 finds the key status of "BLOCK", then logs the result of step 224, and it blocks usage of the key, as disclosed at step 228. If the authorizer 32 finds the key status of "ALLOW", then it allows usage of the key, as disclosed at steps 226 and 230, otherwise control continues to step 206 if the key is not found.

The managed status processor 38 in the authorizer 30 generates a key authorization query 46, indicative of the key, as depicted at step 206. The managed status processor 38 then checks if a remote key authorization server 33 is connected to process the key authorization query 46, as shown at step 208. If a remote key authorization server 33 is available, then the authorizer 32 sends the key authorization query 46, as depicted at step 210, otherwise the managed status processor 38 processes the key authorization query 46 locally from the managed rule DB 40, as shown at step 212. The managed status processor 38 receives the key usage authorization result, as depicted at step 214, and performs a check to determine if communications are to be blocked or allowed, as depicted at step 216. If the key usage authorization result indicates "block," the enforcer 30 logs the results are logged at step 224 and the enforcer blocks communications using the key, as shown at step 228. Otherwise, if the key usage authorization result indicates "allow," communications are logged and allowed, as shown at steps 226 and 230.

If the rule based result via the managed status processor 38 was still not deterministic, the authorizer implements a default action, as shown at step 218. The default action processor 40 performs a default action of either block, allow, or hold, and is similar for each key, as shown in step 220. A hold result indicates that the remote key authorization server 33 is still computing key usage authorization results. If the default action is hold, then control reverts to step 218 until the results are received or until a timeout expires, as depicted at step 222. Otherwise, the device 12 logs the triggering key along with the results, as shown at step 224, and the enforcer 30 either blocks secure communications, as shown at step 226, or allows secure communications, as shown at step 227, depending on the key usage authorization results. It should be noted that the description with respect to FIG. 4c is exemplary, and is not suggestive of limiting the security enforcement to IPsec or IKEP based usage, or of requiring the intended key in a plaintext form, but rather of illustrating a particular configuration for operation.

FIG. 5 is a diagram of a managed key list 36 employed by the data communications device 12 of FIG. 3. Referring to FIGS. 5 and 3, the managed key list 36 stores known keys 50 and the corresponding status 58. In a particular embodiment, other fields associated with the key 50 are stored, including the IP address 52 of the user associated with the key 50, the cipher 54 of the key, a known local identifier 56 for identifying session keys created from the key, and the status 58 of "block" or "allow." As indicated above, in particular implementations, mere presence on the list is indicative of a "block" status; alternatively, the status field is explicit.

The key status processor 34 identifies an indicator of an intended key or other previous secure session indicator from the secure authorization query, and searches for a match in the managed key list 36. If the secure authorization query 46 does not include a key 50, it may include the local ID 56 corresponding to a previous session employing a key stored on the endpoint device 18 for session key reuse. Typically, the key status processor 34 performs a match query against an intended key to determine a secure usage result 48. If the key status query is not deterministic, the managed status processor 38 attempts a rule based approach to determining the secure usage result 48.

Alternate configurations employ other values to enable identification of parameters from previous sessions, such as the hash of the key, the certification, a hash of the certificate, or a value known to be derived mathematically from attributes of the two communicating parties (such as {ID-I}PK-R, which is the identity of one party encrypted using the public key of the other party). Accordingly, the local identifier 56 alternatively indicates an SSL Session ID or a Security Parameter Index (SPI) value that is encapsulated within successive traffic, such as IPSec packets or SSL sessions that attempt to reuse this SSL session id, to correctly associate that later traffic with this entry. In other words, the local ID 56 is for identifying latter traffic (packets, sessions) that are relying upon keys associated with this table entry. In this manner, the local ID 56 operates as an entry in a cache of status decisions made about encryption-usage, in which the entry is tagged by key information and/or session-id/SPI information and/or IP address information for efficient searching.

Figure 6:
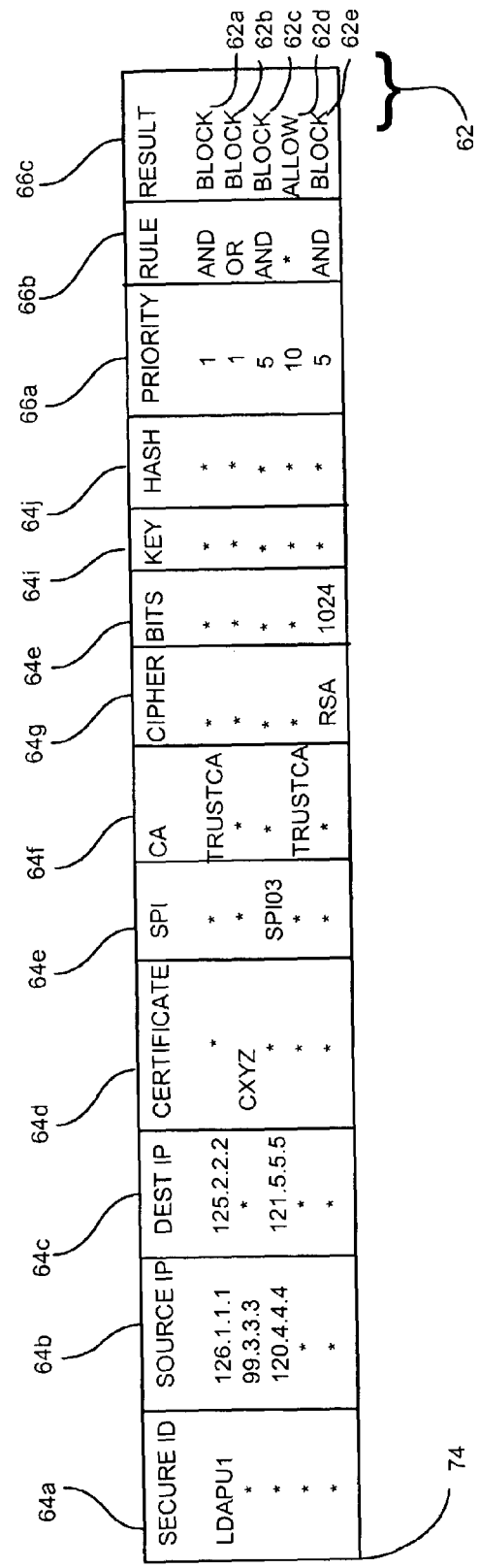
FIG. 6 is a diagram of a managed rule database employed by the data communications device of FIG. 3.

FIG. 6 is a diagram of a managed rule table 74 employed by the data communications device of FIG. 3. Referring to FIGS. 6 and 3, an exemplary implementation of a rule based system for processing the key usage authorization query is shown. The managed rule table 74 in the managed rule database (DB) 40 stores attributes values 62 corresponding to key material attributes 64a-64j for a particular key, and is responsive to the managed status processor 38 for generating the key usage authorization result from a key usage authorization query. The managed rule table 74 also stores control fields 66a-66c, described below. As indicated above, the key authorization operations are alternatively offloaded onto a remote key authorization server 33 (FIG. 2).

The managed rule database shown is by way of example only to be illustrative of rule based processing of keying attributes for computing the key usage authorization result. Alternate configurations employ other database formats and may include a rule query syntax language as is apparent to those skilled in the art. The managed status processor 38 populates the data fields 64a-64j using information extracted from secure authorization queries of users 14. The data fields include a secure ID 64a, such as a distinguished name (DN) or other LDAP (Lightweight Directory Assisted Protocol) index, source IP address 64b, destination IP address 64c, certificate 64d, service profile ID (SPI) 64e, certificate authority (CA) 64f, encryption cipher or method 64g, size of the key 64h, the key itself 64i and key hash result 64j. Control fields include a rule priority 66a, a rule directive 66b, either conjunctive or disjunctive, and a result 66c (allow/disallow). External sources may also populate the DB 40. Not all values 62 are populated, and wildcard entries, denoted by an asterisk, indicate unpopulated fields.

As indicated above, the security enforcement device focuses on known security protocols and key exchange sequences, such as IKE, IPsec, and PPTP or other indications of a VPN. The rules provide a deterministic method for identification of, and response to, known security protocols, as opposed to exhaustive coverage and prevention of all possible or anticipated methods of initiating secure communications. By enumerating or identifying patterns and keying attributes associated with unauthorized key use, the security enforcement device identifies a user who is communicating via the most common and most likely security protocols while avoiding the performance and throughput implications of exhaustively decrypting and processing all data traffic.

In this manner, the rules allow enumeration of facts surrounding post-key generation usage, such as SPI use, to identify typical implementations of session key reuse. Post generation usage occurs when a key generated for a previous session is reused within a certain time interval. In this context, a post-key generation usage generally does not require an initial message containing a plaintext key, but rather embeds an identifier such as the SPI or other index pointing to the key, which is actually stored on one of the endpoint devices. Such post-key-bootstrapping identification allows efficient detection and tracking of suspect key usage without burdening the device throughput with exhaustive processing and analysis of all throughput traffic.

In a particular configuration, the rule table 74 can be thought of as a collection of facts about keys. For any known key or attribute thereof 62, the rule database 40 stores a corresponding key usage authorization result 66c. The data fields 64a-64j store gathered key attributes. The control fields 66a-66c store control information about rule applicability.

For a given key authorization query, the managed status processor 38 traverses the DB 40 to find entries 62a-62e (62n generally) with matching key attribute values. Each entry 62n denotes a particular fact. The managed status processor 38 matches data fields 64a-64j with the key usage authorization query. For a match of a particular entry 62n, the rule field 66b indicates whether a conjunctive or disjunctive (logical and/or) applies to trigger a match. Wildcards ("*") are ignored. For a triggered match, the corresponding result applies. In the case of multiple matches, the priority field 66b determines which of the triggered matching entries 62n the managed status processor will apply as the key usage authorization result.

Therefore, the managed rule database matches on a set of attributes 64a-64j which must all match (conjunctive rule), a set of attributes for which any match (disjunctive rule) will trigger the result 66c, and can include priority such that more general rules 62n are refined by more specific rules 62n. For example, a rule entry 62d specifies that keys certifies by TRUST CA (64f) are ALLOWed (66c), however, rule 62d has a priority 66a of 10, so a secure communication from DN LDAPU1 (64a), from IP address 126.1.1.1 (64b) to destination (64c) of 125.2.2.2 is disallowed, as indicated by result 66c for rule entry 62b because the priority of 66a is 1 and therefore takes precedence over rule 62d. The foregoing example is exemplary; other implementations of a rule-based system for generating the key usage authorization results are suitable for use according to the present invention.

FIG. 7 is an example of detection and control of secure communications by the data communications device of FIG. 3 via the IKE protocol. Referring to FIGS. 3, 6 and 7, the user 14 having IP address 99.3.3.3 attempts to establish a secure SSL session with the remote endpoint 18. The user 14 sends an IKEP request 70a to the remote endpoint 18. The security enforcement device 12 intercepts the request 70a, and reads the security usage indicator 27 in this IKEP request packet 25. Accordingly, the observer 28 reads the public key contained in the request, and sends it 70b to the authorizer 32. The authorizer 32 queries 70c the managed key list 36 and finds no match. The observer 28 then sends the key to the (70d) managed status processor 38 to generate the key usage authorization query. The managed status processor 38 examines 70e the managed rule database 40, and finds a hit on entry 62b. The source IP (64b) field matches the user 14. While there is no match on the certificate CXYZ field 64d, the rule 66b is disjunctive and the result is BLOCK 66c. Accordingly, the managed status processor 38 returns the secure usage result 70f to the enforcer 30 to block the secure communications. Specific configurations and messages concerning SSL are discussed further below.

In a configuration employing SSL, by way of further example, when an SSL connection is established over a TCP connection and the client sends a Hello message, containing an empty Session ID, the server responds with a Hello message containing a new Session ID. There, the security enforcement device, as in the case of IKE (but more easily for SSL) could block the completion of the session setup, or might not, but in either case ought to record the session ID value so that it can correctly deal with later attempts to reuse it. Then the later case would be when the SSL connection is starting and the client sends a Hello message and that message contains not an empty session id but an old session id and the server responds with the same id; that indicates that the client intends to reuse the old session id, as described further the IETF RFC 302, which defines the SSL protocol version 3.0. (SSL3, Alan O. Freier, Philip Karlton, Paul C. Kocher, Nov. 18, 1996), incorporated herein by reference.

FIG. 8 is an example of detection and control of secure communications by the data communications device of FIG. 3 via the IPsec protocol. Referring to FIGS. 3, 6, and 8, the user 14 attempts to initiate a secure communication session with the remote endpoint 18 using IPsec. The user sends a request 80a to initiate secure communications with the remote endpoint 18. As the user has already established a secure communications session with the remote endpoint 18, the user attempts to reuse a key from a previous session. Accordingly, the request 80a does not contain a key itself, but does contain a SPI having a value SPI03, established from the previous session. The request also includes source and destination IP addresses having values 120.4.4.4 and 121.5.5.5, respectively. The observer 28 recognizes the SPI in the request as a security usage indicator, and sends 80b the packet 25 to the key status processor 34. The key status processor 34 receives the secure authorization query 80b, and determines that as there is no actual key in the query 80b, the processor 34 cannot generate a key status query. The observer 28 sends the secure authorization query 80c to the managed status processor 38 to generate the key usage authorization query. The managed status processor 38 uses the key usage authorization query 80d to search the managed rule DB 40. This particular security enforcement device 12 is in communication with a remote key authorization server 33, and the key usage authorization query is sent 80e to the key authorization server 33.

The managed status processor 38, determining that the managed rule database 40 cannot obtain a timely key usage authorization result, invokes the default action processor 80f to compute a default action pending the response from the key authorization server 33. The default action processor 42 sends a default action of "allow" 80g to the enforcer 32, and the secure communication request 80h is transmitted to the remote endpoint 18.

Concurrently, the key authorization server 33 applies the key usage authorization query to the rule table 74 and matches the SPI field 64e for entry 62c. The rule according to the entry 62c is an AND (66b) with the SOURCE IP and DEST IP fields 64b, 64c respectively, which also matches the user's request. Accordingly, the result 66c field determines the key usage authorization query result of "block," and the server 33 returns the key usage authorization query 80i to the managed status processor 38. The managed status processor 38 in turn returns the secure usage result 80j the to the enforcer 32, so that the enforcer will block subsequent communications from the user 14 to the remote endpoint 18 attempting to use the key corresponding to SPI03. In a particular configuration, the security enforcement device allows an operator to enforce a policy such as "users can only use IPSec to communicate with these three VPN gateways known to correspond to our three business partners" or "users can only use public key certificates that were issued by our in-house CA" or "nobody can use Triple-DES, only regular DES with 56-bit keys," etc. Other such statements and corresponding rules may be implemented. By forming a secure authorization logic that specifies a criterion for approving a key that it is not already known to be on some managed key list or revocation list, on operator enables the device to enforce a policy of not letting users use monitored, or managed keys.

In a particular configuration, described above, users attempt to employ the SSL protocol for secure communication. In the invention as defined by the present claims, the message passing sequence of SSL is anticipated according to the specific rules of the IETF RFC 302, cited above. In an SSL session between a client and a server, corresponding respectively to the users as described above, the cryptographic parameters of the session state are produced by the SSL Handshake Protocol, which operates on top of the SSL Record Layer. When an SSL client and server first start communicating, they agree on a protocol version, select cryptographic algorithms, optionally authenticate each other, and use public-key encryption techniques to generate shared secrets. These processes are performed in the handshake protocol, which can be summarized as follows: The client sends a client hello message to which the server must respond with a server hello message, or else a fatal error will occur and the connection will fail. The client hello and server hello are used to establish security enhancement capabilities between client and server. The client hello and server hello establish the following attributes: protocol version, session ID, cipher suite, and compression method. Additionally, two random values are generated and exchanged: ClientHello.random and ServerHello.random.

Following the hello messages, the server sends its certificate, if it is to be authenticated. Additionally, a server key exchange message may be sent, if it is required (e.g. if their server has no certificate, or if its certificate is for signing only). If the server is authenticated, it may request a certificate from the client, if that is appropriate to the cipher suite selected. After the hello message sequence, the server sends the server hello done message, indicating that the hello-message phase of the handshake is complete. The server will then wait for a client response.

The above described scenario as outlined further in RFC 302, or previous versions thereof, described a typical exchange for many secure communications exchanges on the Internet. It should be noted that this design does not hide the identities of the participants or they public keys they are using or the ciphers they are selecting. The HANDSHAKE PROTOCOL describes the messages exchanged by the client and server to setup an SSL session. The CipherSuite selections are contained in the HELLO messages; this is very similar to the (non-encrypted) messages 1 and 2 in the IKE scenario, where this information is in the SA-proposal and SA-choice portions of the IKE messages. Also similarly, the SSL "Session ID" values are given in these HELLO messages. This is analogous to the "SPI" values used in IKE and then later using in actual IPSec packets to reference the security parameters negotiated by IKE. Unlike IKE, however, the SSL Handshake protocol provides for the client and server public keys (or certificates containing public keys) to be transmitted in other messages of this Handshake protocol. Although these messages are optional, if they are transmitted, this is done just after the Hello messages (see section 7.6.2 of the Freier et al. SSL3 document for example); well before the encryption keys have been chosen. Although the "Finished" message contains hash values that protect the SSL client and SSL server against any tampering of their SSL session setup (handshake protocol) messages, their chosen SSL-Session- ID, cipher selections and public keys and certificate (if any) will have been exposed in the handshake protocol messages and can be checked for authorization by the security enforcement device before the device forwards the Finished messages. Blocking the "Finished" messages will prevent the SSL partners from completing their SSL connection and from exchanging any encrypted application data. Also, even if the Finished messages and other encrypted messages are permitted through this particular TCP connection using SSL, the security enforcement device can record the SSL Session Id observed in the Hello messages of the SSL Handshake protocol and subsequently block attempts by this client and server to reuse that SSL Session Id if, in the meantime, it has received a response indicating that this combination of cipher suite, key sizes, and public keys should be blocked.

Those skilled in the art should readily appreciate that the programs and methods for managing secure communications as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of instructions embedded in a carrier wave. Alternatively, the operations and methods may be embodied in whole or in part using hardware components, such as Application Specific Integrated Circuits (ASICs), state machines, controllers or other hardware components or devices, or a combination of hardware, software, and firmware components.

While the system and method for managing secure communications has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. In a data communications device, a method of managing secure communications comprising:
    packet sniffing one or more network packets from a first endpoint device and traversing the data communications device destined for a second endpoint device to identify:
        (i) a request from a first endpoint device to initiate secure communications between the first endpoint device and the second endpoint device, and
        (ii) a security usage indicator in the request indicative of an intended secure session to be established between the first and second endpoint devices;
    analyzing the identified security usage indicator to determine an intended key to be used in establishing the secure communications;
    computing a secure usage result indicative of whether to allow the intended secure session to be established, comprising:
        mapping one or more attributes of the intended key to a respective one or more entries within a data store; and
        applying one or more rules corresponding to the one or more entries within the data store to compute the secure usage result, wherein each of the one or more rules is associated with a respective priority value indicating a relative priority of the rule with respect to the other rules; and
    enforcing the computed secure usage result by selectively allowing and prohibiting establishment of the intended secure session for secure communications between the first and second endpoint devices, comprising at least one of (i) disallowing communications, (ii) allowing secure communications pending further key usage authorization results, (iii) logging communications, and (iv) allowing secure communications.

2. The method of claim 1, where the first and second endpoint devices are unaware of the data communications device enforcing the secure usage result.

3. The method of claim 1, where the data communications device comprises a router disposed between the first endpoint device and the second endpoint device.

4. The method of claim 1, wherein computing the secure usage result comprises generating at least one of, a key status query, a key usage authorization query, and a default action query, operable to generate the secure usage result.

5. The method of claim 4, wherein computing the secure usage result comprises:
    generating the key status query including the intended key;
    receiving, at a key status processor the key status query;
    comparing, via the key status processor, the intended key to a managed key list having managed keys; and
    computing the secure usage result based on the outcome of the comparing.

6. The method of claim 4, wherein computing the secure usage result further comprises:
    generating the key usage authorization query and keying material attributes;
    computing, in a managed status processor, a rule deterministic of a managed status of the intended key;
    applying the rule to the keying material attributes to generate a key usage authorization result; and
    computing the secure usage result based, at least in part, on applying the rule.

7. The method of claim 4, wherein computing the secure usage result further comprises:
    generating the default action query;
    computing, in a default action processor, a default action indicative of an acceptable usage of the intended key; and
    computing the secure usage result based, at least in part, on the computer default action.

8. The method of claim 4, wherein computing the secure usage result further comprises:
    generating a key status query where the key status query produces the secure usage result, and examining the secure usage result;
    generating, if examining the secure usage result of the key status query is undeterministic of the intended key, the key usage authorization query and examining the corresponding secure usage result; and
    generating, if the key usage authorization query is undeterministic of the intended key, the default action query and examining the corresponding secure usage result.

9. The method of claim 5, where the key status query further comprises:
    indexing, in a local datastore, the security usage indicator to retrieve a Boolean indicator corresponding to permissible usage of the intended key for secure communications.

10. The method of claim 6 wherein the secure usage result is not immediately indicative of permissible use and enforcing the secure usage result further comprises:
- applying the default action until a secure usage result from the key usage authorization query is available; and
- applying the secure usage result from the key usage authorization query to subsequent requests to initiate secure communications.

11. The method of claim 10, where the key usage authorization query further comprises:
- transmitting the key usage authorization query to a remote node operable to invoke a rule base for determining the secure usage result; and
- receiving, from the remote node at the data communications device, the secure usage result.

12. The method of claim 1, wherein determining an intended key to be used in establish the secure communications comprises determining a key operable for cryptographic communications.

13. A data communications device for managing secure communications comprising:
- an observer operable to sniff communications received by the data communications device and identify, from communications between a first endpoint device and traversing the data communications device destined for a second endpoint device, a security usage indicator indicative of an intended secure session to be established between the first and second endpoints; and
- an authorizer coupled to the observer having secure authorization logic operable to analyze the security usage indicator to compute, by operation of one or more computer processors, a secure usage result indicative of whether or not to allow the intended secure session, wherein the authorizer is configured to map one or more attributes of an intended key, determined by analyzing the identified security usage indicator, to a respective one or more entries within a data store and to apply one or more rules corresponding to the one or more entries within the data store to compute the secure usage result, wherein each of the one or more rules is associated with a respective priority value indicating a relative priority of the rule with respect to the other rules; and
- an enforcer operable to enforce the secure usage result at the data communications device by selectively allowing and prohibiting establishment of the intended secure session for secure communications between the first and second endpoint devices, comprising at least one of (i) disallowing communications, (ii) allowing secure communications pending further key usage authorization results, (iii) logging communications, and (iv) allowing secure communications.

14. The device of claim 13 wherein the detector is unintrusive such that the communications endpoints are unaware of the secure authorization query and the applying the secure communications result.

15. The device of claim 13 wherein the authorizer is further operable to generate a secure authorization query comprising at least one of a key status query, a key usage authorization query, and a default action query, each of the status query, the key usage authorization query, and the default action query adapted to generate the secure usage result.

16. The device of claim 13 wherein the authorizer further includes a managed key list having managed keys and a key status processor operable to generate a key status query and further operable to:
- generate the key status query including the intended key;
- receive, at a key status processor the key status query;
- compare, via the key status processor, the intended key to the managed keys on the managed key list; and
- compute the secure usage result based on the outcome of the comparing.

17. The device of claim 13 wherein the authorizer further comprises a default action processor operable to:
- generate the default action query;
- compute, in a default action processor, a default action indicative of an acceptable usage of the intended key; and
- compute the secure usage result based on the computed default action.

18. The device of claim 13 wherein the authorizer is further operable to:
- generate a key status query and examining the corresponding secure usage result;
- generate, if examining the secure usage result of the key status query is undeterministic of the intended key, the key usage authorization query and examining the corresponding secure usage result; and
- generate, if the key usage authorization query is undeterministic of the intended key, the default action query and examining the corresponding secure usage result.

19. The device of claim 16 wherein the key status processor is further operable to:
- index, in a local datastore, the security usage indicator and
- retrieve a Boolean indicator corresponding to permissible usage of the security usage indicator for secure communications.

20. The device of claim 13 wherein the key usage authorization result is not immediately indicative of permissible use the managed status processor is further operable to:
- apply the default action until the key usage authorization result is available; and
- apply the key usage authorization result to subsequent requests to initiate secure communications.

21. The device of claim 13 wherein the managed status processor is further operable to:
- transmit the key usage authorization query to a remote node, the remote node having a rule database to be operable to determine the secure usage result; and
- receive, from the remote node, the secure usage result, wherein the remote node is adapted to receive key usage authorization queries from a plurality of data communications devices.

22. The device of claim 13 wherein the authorizer is further operable to analyze the security usage indicator to determine a corresponding key operable for cryptographic communications.

23. The device of claim 13 wherein at least one of the key status processor, the managed status processor, and the default action processor are in a remote key authorization server and accessible via a network transmission.

24. The device of claim 13 wherein the security usage indicator for the intended secure communications conforms to a predetermined protocol of establishing secure communications, the predetermined protocol operable to define secure communications between a plurality of interconnected nodes.

25. A method of key usage enforcement comprising:
- packet sniffing, at a key enforcement device, communications from a first endpoint device and traversing the key enforcement device destined for a second endpoint device to identify a request to initiate secure communications between the first and second endpoint devices;

interrogating the request to determine a security usage indicator indicative of an intended secure session to be established between the first and second endpoint devices;

identifying, from the security usage indicator, an intended key to be employed in establishing the secure communications;

computing a secure usage result indicative of whether to allow the intended secure session to be established, comprising:

mapping one or more attributes of the intended key to a respective one or more entries within a data store; and applying one or more rules corresponding to the one or more entries within the data store to compute the secure usage result, wherein each of the one or more rules is associated with a respective priority value indicating a relative priority of the rule with respect to the other rules;

enforcing the computed secure usage result by selectively allowing and prohibiting establishment of the intended secure session for secure communications between the first and second endpoint devices, comprising at least one of (i) disallowing communications, (ii) allowing secure communications pending further key usage authorization results, (iii) logging communications, and (iv) allowing secure communications.

26. A computer program product including a computer readable medium for encoding program logic thereon, the computer readable medium having computer program code for managing secure communications comprising:

computer program code for packet sniffing, at a data communications device, one or more network packets from a first endpoint device and traversing the data communications device en route to a second endpoint device, to identify (i) a request to initiate secure communications between the first and second endpoint devices and (ii) a security usage indicator indicative of an intended secure session to be established between the first and second endpoint devices;

computer program code to analyze the identified security usage indicator to determine an intended key to be used in establishing the secure communications;

computer program code for computing a secure usage result indicative of whether or not to allow the intended secure session to be established, comprising mapping one or more attributes of the intended key to a respective one or more entries within a data store, and applying one or more rules corresponding to the one or more entries within the data store to compute the secure usage result, wherein each of the one or more rules is associated with a respective priority value indicating a relative priority of the rule with respect to the other rules; and computer program code for enforcing the secure usage result by selectively allowing and prohibiting establishment of the intended secure session for secure communications between the first and second endpoint devices, comprising at least one of (i) disallowing communications, (ii) allowing secure communications pending further key usage authorization results, (iii) logging communications, and (iv) allowing secure communications.

27. A data communications device for managing secure communications comprising:

means for identifying, by packet sniffing one or more network packets from a first endpoint device and traversing the data communications device en route to a second endpoint device, (i) a request to initiate secure communications between the first endpoint device and a second endpoint devices, and (ii) a security usage indicator indicative of an intended secure session to be established employed for the secure communications between the first and second endpoint devices;

means for analyzing the identified security usage indicator to determine an intended key to be used in establishing the secure communications;

means for computing a security usage result indicative of whether to allow the intended secure session to be established, comprising:

means for mapping one or more attributes of the intended key to a respective one or more entries within a data store; and means for applying one or more rules corresponding to the one or more entries within the data store to compute the secure usage result, wherein each of the one or more rules is associated with a respective priority value indicating a relative priority of the rule with respect to the other rules;

and means for enforcing the computed secure usage result by selectively allowing and prohibiting establishment of the intended secure session for secure communications between the first and second endpoint devices, comprising at least one of:

means for disallowing communications;

means for allowing secure communications pending further key usage authorization results;

means for logging communications; and means for allowing secure communications.

* * * * *